United States Patent [19]

Nagano

[11] Patent Number: 4,637,809
[45] Date of Patent: Jan. 20, 1987

[54] REAR DERAILLEUR FOR A BICYCLE
[75] Inventor: Masashi Nagano, Izumi, Japan
[73] Assignee: Shimano Industrial Company Limited, Osaka, Japan
[21] Appl. No.: 799,615
[22] Filed: Nov. 19, 1985
[30] Foreign Application Priority Data
  Nov. 30, 1984 [JP] Japan .................. 59-254687
  Oct. 2, 1985 [JP] Japan .................. 60-219829
[51] Int. Cl.⁴ .............................. F16H 9/00
[52] U.S. Cl. ............................ 474/80; 474/82
[58] Field of Search ...................... 474/80, 82
[56] References Cited
  U.S. PATENT DOCUMENTS
  4,384,864  5/1983  Bonnard ................ 474/80 X
  4,530,677  7/1985  Nagano ................. 474/80

Primary Examiner—James A. Leppink
Assistant Examiner—Frank H. McKenzie, Jr.
Attorney, Agent, or Firm—Stevens, Davis, Miller & Mosher

[57] ABSTRACT

A rear derailleur for a bicycle having a linkage mechanism supported swingably to a fixing member through a first horizontal shaft, a first spring interposed between the linkage mechanism and the fixing member, and a second spring interposed between a movable member at the linkage mechanism and a chain guide, so that the first and second springs balance with each other to allow the linkage mechanism and chain guide to swing, thereby controlling a guide pulley at the chain guide in position with respect to each sprocket at the multistage sprocket assembly. Hence, even when the position to support an operating wire for the linkage mechanism during the swinging motion thereof varies to vary the position of the guide pulley with respect to the multistage sprocket assembly, an interval between the chain and the urging surface therefor is held constant.

6 Claims, 15 Drawing Figures

REAR DERAILLEUR FOR A BICYCLE

FIELD OF THE INVENTION

The present invention relates to a rear derailleur for a bicycle, and more particularly to a rear derailleur for shifting a driving chain from one sprocket to another at a multistage sprocket assembly mounted on a rear hub of the bicycle.

BACKGROUND OF THE INVENTION

The conventional rear derailleur for shifting the driving chain has hitherto been well-known, which ordinarily comprises a fixing member, a linkage mechanism provided with a base member, two linkage members and a movable member, and a chain guide provided with a guide pulley, a tension pulley and a pulley plate provided with an urging plate which extends toward the path of the chain travelling from the guide pulley to each sprocket at a multistage sprocket assembly and is opposite to the chain. The linkage mechanism, which fixes the base member to the fixing member, is mainly swingable by a first horizontal shaft, interposes between the linkage mechanism and the fixing member a first spring which biases the linkage mechanism to move away from the center of the multistage sprocket assembly, pivotally supports the chain guide to the movable member in relation of being swingable through a second horizontal shaft, and interposes between the chain guide and the movable member a second spring which applies tension to the driving chain, so that the first and second springs balance in tension with each other to control the position of the guide pulley with respect to each sprocket at the multistage sprocket assembly.

The rear derailleur employing the aforesaid first and second springs is disclosed in, for example, the Japanese Patent Laid-Open Gazette No. Sho 58-149,882, which is so constructed that the first and second springs apply the predetermined tension to the chain and balance in tension with each other to set the chain guide in position, in detail, the guide pulley at the chain guide in position with respect to each sprocket at the multistage rear sprocket assembly. Also, the chain is shifted from a smaller diameter sprocket to a larger diameter one at the multistage sprocket assembly through the urging surface at the pulley plate coming into contact with the chain to forcibly urge the chain toward the larger diameter rear sprocket. In addition, generally an operating wire is fixed to one linkage member and an outer sheath for guiding the operating wire is supported to the base member.

Figure 9:
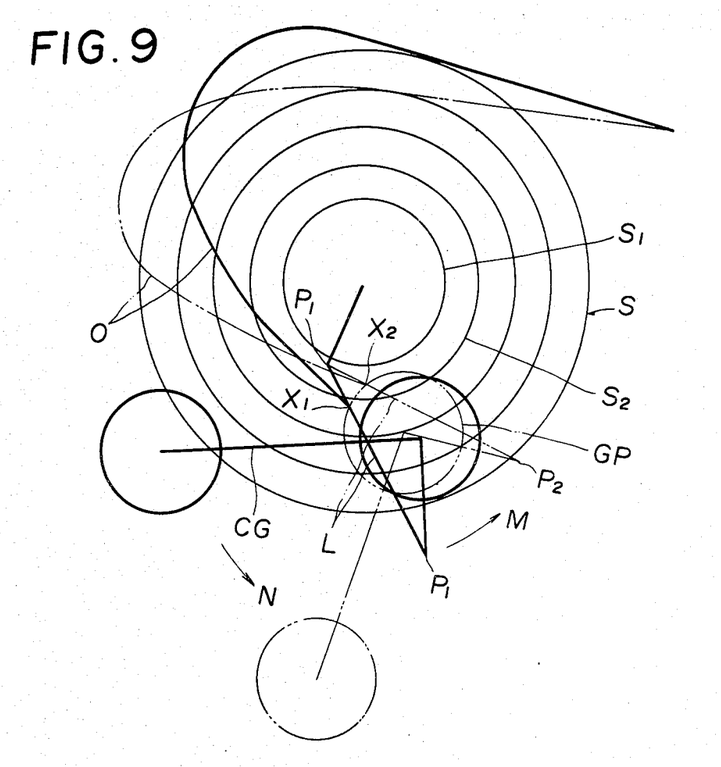
FIG. 9 is an illustration of movement of a linkage mechanism and a chain guide with respect to a multistage sprocket assembly.

In the driving stage that the chain is stretched between the smaller diameter sprockets at the multistage rear sprocket assembly and at a multistage front sprocket assembly, when the chain is shifted from the smaller diameter front sprocket to a larger diameter front sprocket by operating a front derailleur, a linkage mechanism L, as schematically shown in FIG. 9, swings counterclockwise around a first horizontal shaft $P_1$ as shown by the arrow in FIG. 9 and along the plane perpendicular to a hub shaft and the chain guide CG swings in the same manner as the linkage mechanism, both the linkage mechanism L and chain guide CG shifting from the positions shown by the dotted lines to that shown by the dot-and-dash lines respectively. In this case, the outer sheath O supporting position on the linkage mechanism is displaced from the point $X_1$ to $X_2$ in FIG. 9 as the linkage mechanism L swings, so that a curvature of a curving portion of the outer sheath O at the multistage rear sprocket assembly side is reduced from that shown by the solid line to that shown by the dot-and-dash line. Accompanied with this, the tension of operating wire increases to act on the linkage mechanism L to an extent of the tension increase, whereby the linkage mechanism L, even if the operating lever is not operated, deforms automatically axially inwardly of the multistage rear sprocket assembly.

Figure 15:
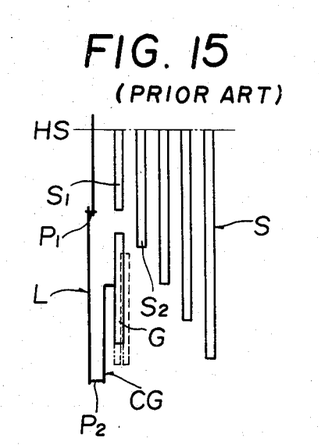
FIG. 15 is an illustration of the displacement process of the guide pulley at the conventional rear derailleur.

The conventional rear derailleur provided with the first and secnod horizontal shafts parallel to each other is constructed to make the path of swinging motion of the linkage mechanism parallel to that of the chain guide, so that when the chain is shifted from the smaller diameter front sprocket to the larger diameter one, the guide pulley GP at the chain guide CG shifts radially along the plane perpendicular to the hub shaft HS at the multistage rear sprocket assembly S as the linkage mechanism L and chain guide CG swing around the first and second horizontal shafts $P_1$ and $P_2$ respectively. The displacement increases the tension of the operating wire so as to deform the linkage mechanism L axially inwardly of the multistage rear sprocket assembly S, whereby the guide pulley GP is displaced from the position shown by the solid line to that shown by the dot-and-dash line in FIG. 15. In other words, the guide pulley GP is displaced toward a second rear sprocket $S_2$ of a larger diameter and adjacent to a first rear sprocket $S_1$ carrying the chain. As a result, the chain guided by the guide pulley GP to the first rear sprocket $S_1$ is slanted between the guide pulley GP and the first rear sprocket $S_1$ to come into contact with the urging surface at a pulley plate of the chain guide CG to generate a sound. In order to prevent the soundmaking, there is the trouble that an operating lever for the rear derailleur must intentionally be restored. Especially, when a positoning mechanism is provided at the rear derailleur or the operating lever therefor, the conventional derailleur has a large defect.

SUMMARY OF THE INVENTION

An object of the invention is to solve the problem that when the chain is shifted from the smaller diameter front sprocket to the larger diameter front sprocket at the multistage front sprocket assembly and the linkage mechanism and chain guide swing, the chain guided to the first rear sprocket $S_1$ by the pulley plate comes into contact therewith to generate a sound. The conventional derailleur has the first and second horizontal shafts parallel to the axis of the multistage rear sprocket assembly and the urging surface at the pulley plate is a flat surface parallel to the plane perpendicular to the axis of the multistage rear sprocket assembly, so that when the chain is shifted from the smaller diameter front sprocket to the larger diameter one, an interval between the chain and the urging surface at the pulley plate opposite thereto is constant, in other words, the interval becomes smaller than a maximum to keep the urging surface apart from the chain. The inventor has paid attention in the above matter so as to design the present invention, in which one of the first and second horizontal shaft is slanted with respect to the axis of the multistage rear sprocket assembly, a tubular shaft fitted onto the horizontal shaft is slanted at the outer periphery, or a recess to shift axially outwardly of the sprocket assembly is provided on the urging surface at the pulley plate, whereby when the chain is shifted from the smaller diameter front sprocket to the larger diameter one and the linkage mechanism and chain guide swing, the interval between the urging surface and the chain becomes more than a predetermined value, thereby preventing the aforesaid sound making.

The derailleur of the present invention which is provided with; a fixing member; a linkage mechanism comprising a base member, two linkage members, and a movable member and pivotally supported to the fixing member through a first horizontal shaft; a chain guide which comprises a guide pulley, a tension pulley, and a pulley plate having an urging surface extending in the direction of the path of the chain to shift from the guide pulley to each rear sprocket at the multistage rear sprocket assembly and being opposite to the chain and which is pivotally supported to the movable member through a second horizontal shaft; a first biasing means interposed between the fixing member and the base member; and a second biasing means interposed between the movable member and the chain guide; so that when the chain is shifted to one of the rear sprockets at the multistage rear sprocket assembly, or to one of the front sprockets at the multistage front sprocket assembly, the linkage mechanism and chain guide are adapted to swing. The derailleur of the invention is provided with a holding means which holds more than a constant value an interval between the chain and the urging surface at the pulley plate opposite to the chain.

Incidentally, the aforesaid constant interval means the minimum interval through which the urging surface does not come into contact with the chain.

The holding means of the invention is so constructed that the first or second horizontal shaft is slanted with respect to the axis of the multistage sprocket assembly, the slanting direction is the direction of displacing the guide pulley axially outwardly of the multistage sprocket assembly when the linkage mechanism swings in the direction reverse to the biasing direction of the first biasing means.

Alternatively, the holding means may be so constructed that on the urging surface of the pulley plate at the chain guide is provided a recess for receiving therein the chain passing along the recess when the linkage mechanism swings in the direction reverse to the biasing direction of the first biasing means, or when the chain guide swings in the biasing direction of the second biasing means.

In a case where the first horizontal shaft is slanted, since the first horizontal shaft must be erected in a slanting manner, there is the problem in that how the first horizontal shaft is fixed and an angle of inclination is difficult to set with accuracy. Such the problem is solved by accurately fitting a tubular shaft onto the first horizontal shaft and the axis with respect to the outer periphery is slanted to the axis of the first horizontal shaft.

In either case, the chain, which is stretched between the smaller diameter front sprocket at the multistage front sprocket assembly and the smaller diameter rear sprocket at the multistage rear sprocket assembly, is shifted to the larger diameter front sprocket, the link mechanism and chain guide swinging in balance of the first and second biasing means, thereby controlling the position of the guide pulley with respect to the rear sprocket. At this time, the outer sheath supporting position is displaced, for example, from $X_1$ to $X_2$ in FIG. 9 so that the curvature of the outer sheath varies and the tension of the operating wire increases to deform the linkage mechanism, thereby displacing the guide pulley axially inwardly of the multistage sprocket assembly, that is, toward the larger diameter sprocket. The guide pulley is displaced axially outwardly by the holding means as the linkage mechanism and chain guide swing, or the chain is opposite to the recess at the urging surface. As a result, an interval between the urging surface and the chain can be kept constant. Accordingly, even when the curvature of the outer sheath varies to shift the guide pulley axially inwardly of the multistage sprocket assembly, it is ensured that the chain is prevented from coming into contact with the urging surface of the pulley plate and from generating a sound.

These and other objects of the invention will become more apparent in the detailed description and examples which follow.

BRIEF DESCRIPTION OF THE INVENTION

FIGS. 5 to 8 show a third embodiment of the invention, in which

DETAILED DESCRIPTION OF THE INVENTION

An embodiment of a rear derailleur of the invention will be detailed in accordance with the drawings.

Figure 1:
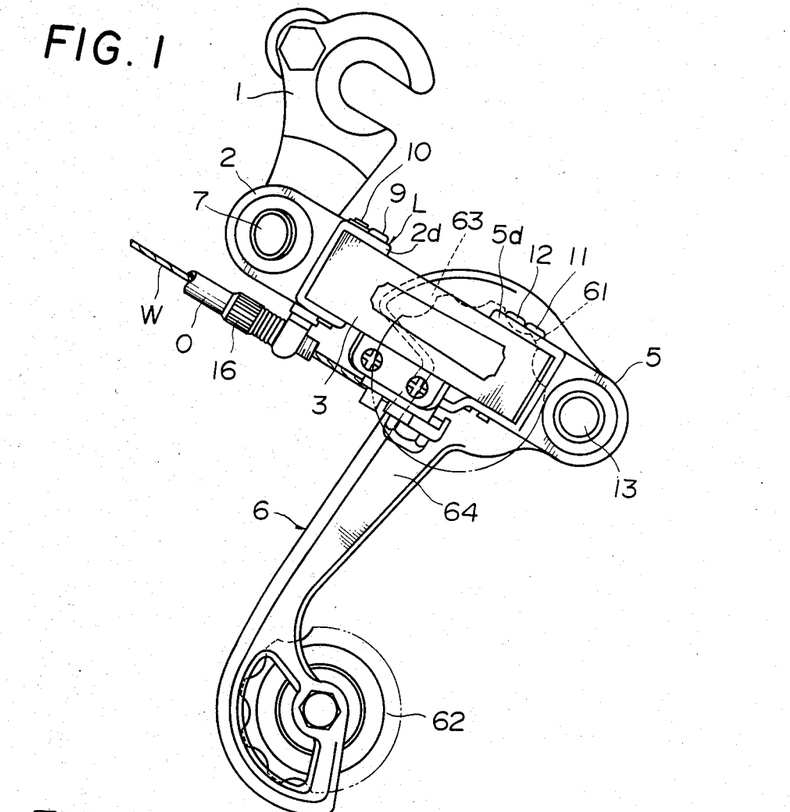
FIG. 1 is a front view of a first embodiment of a rear derailleur of the invention.
Figure 2:
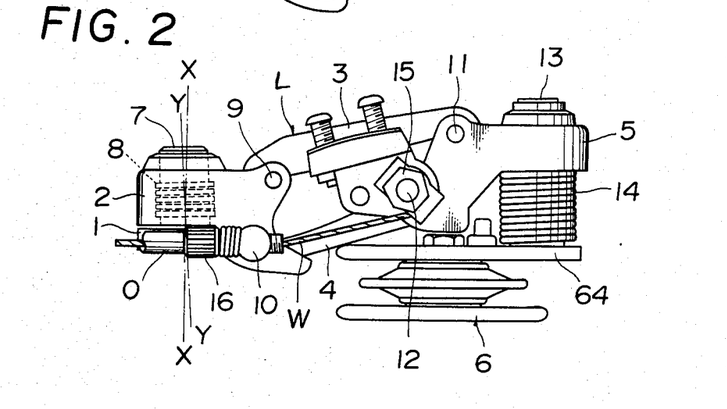
FIG. 2 Is a bottom view of the FIG. 1 embodiment.

The derailleur of the present invention, is used together with a multistage rear sprocket assembly S. The basic construction of the derailleur, as shown in FIGS. 1 and 2, comprises a fixing member 1; a deformable linkage mechanism L comprising a base member 2, two linkage members 3 and 4 and a movable member 5; and a chain guide 6 comprising a guide pulley 61, a tension pulley 62 and a pulley plate 64 provided with an urging surface 63 extending in the direction of the path of the chain travelling from the guide pulley 61 to each rear sprocket at the multistage rear sprocket assembly S; so that when the chain is shifted from one rear sprocket to another at the multistage rear sprocket assembly S, or from one front sprocket to another at a multistage front sprocket assembly (not shown), the linkage mechanism L and chain guide 6 are adapted to swing.

The fixing member 1 is composed of a fork end of the bicycle, or is separate therefrom to be fixed to the fork end. The base member 2 at the linkage mechanism L is supported to the fixing member 1 through a first horizontal shaft 7, and between the fixing member 1 and the base member 2 is interposed a first biasing means 8 mainly of a spring for biasing the guide pulley 61 to move away from the axis of the multistage sprocket assembly, in other words, clockwise in FIG. 9.

The base member 2 is provided at one end with a pair of mounting legs 2d opposite to each other and the linkage members 3 and 4 are pivoted to the mounting noses 2d through a pair of pins 9 and 10 respectively, the movable member 5 being pivoted to the free ends of linkage members 3 and 4 through a pair of pins 11 and 12 respectively.

The movable member 5 is shaped like the base member 2 and provided at one side with mounting noses 5d opposite to each other, the pins 11 and 12 being mounted on the mounting noses 5d to thereby swingably pivot the linkage members 3 and 4 thereto respectively. On the other side of the movable member 5 is mounted the chain guide 6 in relation of being rotatable only in a predetermined range through a second horizontal shaft 13 extending in the same direction as the first horizontal shaft 7, and between the movable member 5 and the chain guide 6 is provided a second biasing means 14 mainly of a spring to bias the chain guide 6 clockwise in FIG. 9 and apply tension to the chain.

The linkage mechanism L is provided with a return spring (not shown), for example, between the linkage member 3 or 4 and the movable member 5 or the base member 2, the return spring biasing the chain guide 6 axially of the sprocket assembly S, that is, toward the smaller diameter rear sprocket $S_1$ or the larger one, usually, toward the sprocket $S_1$. Also, an operating wire W is fixed to the pin 12 on the linkage member at the movable member 5 side through a fixture 15 and an outer sheath O for guiding the operating wire W is supported to the pin 10 on the same at the base member 2 side through a support 16.

The rear derailleur of the invention is provided with a holding means for holding more than a predetermined value an interval between the chain and the urging surface 63 at the pulley plate 64 opposite to the chain, in response to the swinging motions of the linkage mechanism and chain guide when the chain is shifted to one rear sprocket or one front sprocket.

The holding means in the first embodiment, when the linkage mechanism L swings, allows the axis Y-y of the first horizontal shaft 7 to be slanted with respect to the axis X-x of the hub shaft at the multistage rear sprocket assembly S so that the axial position of the guide pulley 61 with respect to the multistage sprocket assembly is adjusted.

In this case, the axis of the second horizontal shaft 13 extends in parallel to the axis X-x of the hub shaft at the multistage rear sprocket assembly.

When the linkage mechanism L swings against the first bias means 8 counterclockwise in FIG. 9, the first horizontal shaft 7 is adapted to slant in the direction of shifting the guide pulley 61 axially outwardly of the multistage sprocket assembly S with respect to the plane perpendicular to the hub shaft for the sprocket assembly S, in which an angle θ of inclination is about 2 to 4 degrees. The angle θ of the first horizontal shaft 7 depends upon a distance between the outer periphery of the guide pulley 61 and the tooth crest of the rear sprocket, or a difference in the numbers of teeth at the multistage sprocket assembly, and may be acceptable of an angle other than 2 to 4 degrees. In addition, in FIG. 3, the first horizontal shaft 7 is slanted at an angle of 20° for convenience of explanation.

Next, explanation will be given on operation of the rear derailleur constructed as foregoing. At first, explanation will be given on the case where the guide pulley 61 at the chain guide 6 is positioned corresponding to the first rear sprocket $S_1$ of the smallest diameter at the multistage rear sprocket assembly as shown by the solid line in FIG. 9 and is guiding the chain to the sprocket $S_1$ and the chain is carried by the smaller diameter front sprocket at the multistage front sprocket assembly and then the chain is shifted by operation of the front derailleur from the smaller diameter front sprocket to the larger diameter front sprocket. In this case, the linkage mechanism L swings counterclockwise (in the direction of the arrow M in FIG. 9) around the first horizontal shaft 7 and against the first biasing means 8 through the balance thereof with the second biasing means 14, and the chain guide 6 swings counterclockwise, in the direction of the arrow N in FIG. 9, around the second horizontal shaft 13 and against the second biasing means 14.

Figure 3:
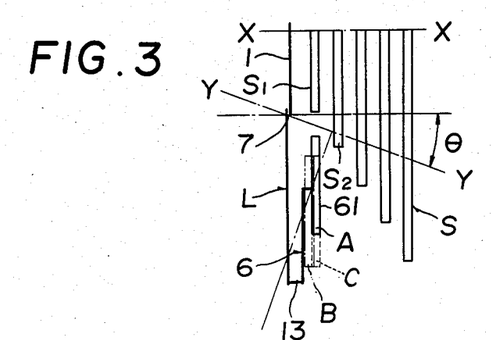
FIG. 3 is an illustration of the displacement process of a guide pulley.

In this case, since the first horizontal shaft 7 is slanted to the axis X-x of the hub shaft at the multistage rear sprocket assembly, the linkage mechanism L swings along the plane slanted with respect to the plane perpendicular to the hub shaft and axially outwardly of the multistage rear sprocket assembly. The guide pulley 61 at the chain guide 6, as shown in FIG. 3, is displaced, following the swinging motion of the linkage mechanism L, from the position A shown by the solid line corresponding to the first rear sprocket $S_1$ to that B, as shown by the dot-and-dash line, at the reverse side to the rear sprocket $S_2$ adjacent to the sprocket $S_1$, in other words, axially outwardly of the multistage sprocket assembly S.

On the other hand, the outer sheath O supporting position at the linkage mechanism is displaced counterclockwise from the point $X_1$ to $X_2$ in FIG. 9 as the linkage mechanism L swings around the first horizontal shaft 7, so that the curvature of the curved portion of the outer sheath O at the multistage rear sprocket side is reduced as shown by the dot-and-dash line in FIG. 9. By accompanied with this, the tension of the operating wire W increases and acts on the linkage mechanism L to an extent of this increment, thereby automatically deforming the linkage mechanism L axially inwardly of the multistage rear sprocket assembly.

The linkage mechanism L deforms axially inwardly of the multistage rear sprocket assembly to displace the guide pulley 61 from the aforesaid position B to the position C shown by the broken line corresponding to the first rear sprocket $S_1$.

Hence, when the chain is shifted from the smaller diameter front sprocket to the larger diameter front sprocket, the interval between the urging surface 63 at the pulley plate 64 and the chain can be kept constant or more than the minimum interval not to bring the urging surface 63 into contact with the chain, thereby enabling the chain guided to the first rear sprocket $S_1$ to be prevented from contact with the urging surface 63.

Figure 4:
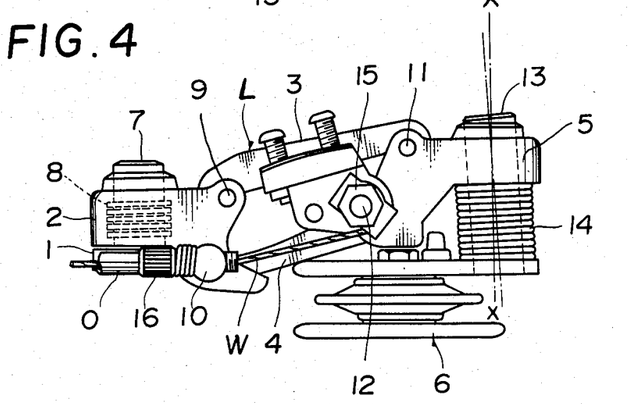
FIG. 4 is a bottom view of a second embodiment of the invention.

The holding means in the second embodiment of the invention, as shown in FIG. 4, has the second horizontal shaft 13 slanted with respect to the axis X-x of the hub shaft at the multistage rear sprocket assembly and slanted in the direction of displacing the guide pulley 61 axially of the multistage rear sprocket assembly when the linkage mechanism L swings. In this case, the direction and an angle of inclination are the same as those in the first embodiment, thereby omitting the explanation herein. Also, the first horizontal shaft 7 in the second embodiment extends in parallel to the axis X-x of the multistage rear sprocket assembly S.

When the chain is shifted from the smaller diameter front sprocket to the larger diameter front sprocket at the multistage front sprocket assembly in this embodiment, the linkage mechanism L swings around the first horizontal shaft 7 along the plane slanted with respect to the plane perpendicular to the hub shaft and the chain guide 6 swings around the second horizontal shaft 13, along the plane slanted with respect to the same, and axially outwardly of the multistage rear sprocket assembly S. In addition, the operation after the swinging motion is the same as the first embodiment, thereby being omitted of its explanation herewith.

Figure 5:
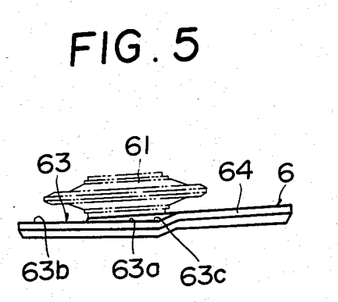
FIG. 5 is a plan view of a pulley plate only.
Figure 6:
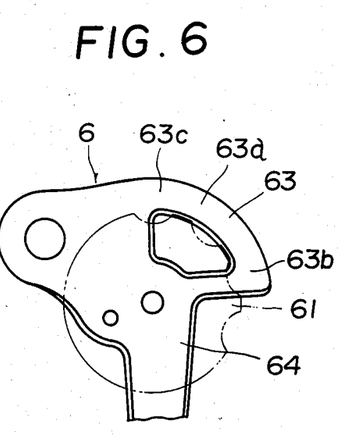
FIG. 6 is a partially omitted rear view of the pulley plate only.

The holding means in the third embodiment of the invention, as shown in FIGS. 5 and 6, is provided at the urging surface 63 of the pulley plate 64 with a recess 63a which receives therein the chain passing along the urging surface 63 when the linkage mechanism L swings against the first biasing means 8 and the chain guide 6 swings againt the second biasing means 14, the recess 63a being recessed axially outwardly of the multistage rear sprocket wheel S.

In detail, the urging surface 63 is slanted axially outwardly of the multistage rear sprocket assembly S from the front 63b to the rear 63c in the travelling direciton of the chain.

in this case, the first and second horizontal shafts 7 and 13 extend in parallel to the axis X-x of the hub shaft at the multistage rear sprocket assembly S.

Figure 7:
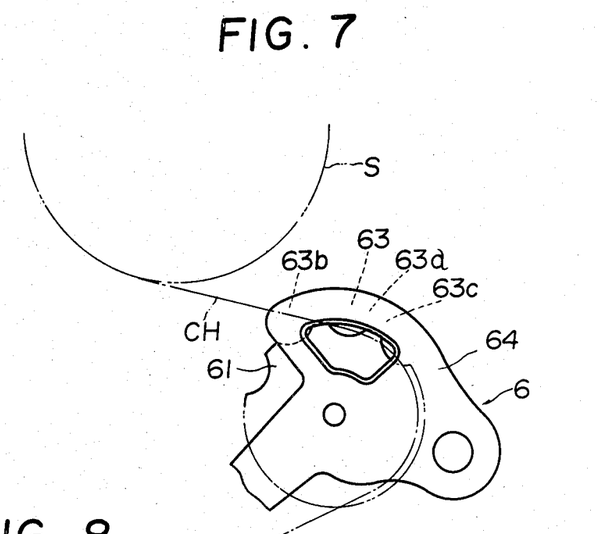
FIGS. 7 and 8 are illustrations of the relation between the urging surface and a driving chain.
Figure 8:
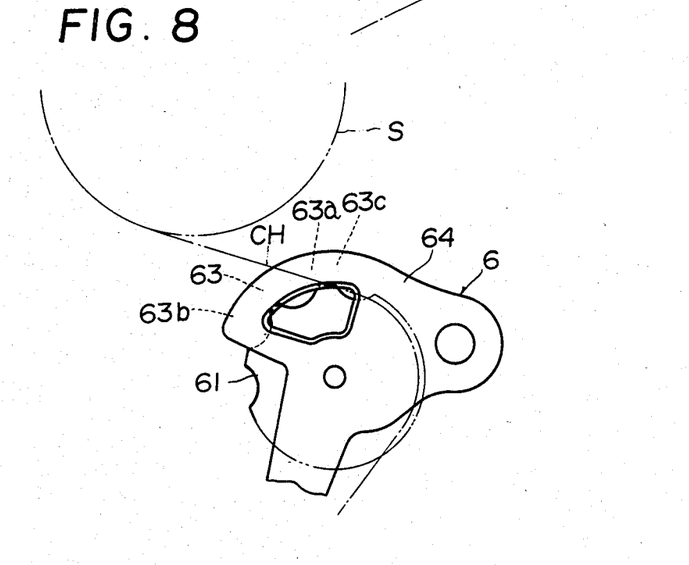

When the chain is carried by the first rear sprocket of the smallest diameter at the multistage rear sprocket assembly S as shown in FIG. 7, the the front 63b of the urging surface 63 is opposite to the chain. Under this condition, when the chain is shifted from the smaller diameter front sprocket to the larger diameter one at the multistage front sprocket assembly and the linkage mechanism L swings around the first horizontal shaft 7 and the chain guide 6 swings around the second horizontal shaft 13, the urging surface 63, as shown in FIG. 8, is opposite at the rear side 63c to the chain CH and the linkage mechanism L swings to increase the tension of operating wire W and the linkage mechanism L is displaced axially inwardly of the multistage rear sprocket assembly S. Then, the guide pulley 61 is displaced toward the second larger diameter rear sprocket $S_2$ adjacent to the first rear sprocket $S_1$ carrying the chain, in which the rear portion 63c of the urging surface 63 has the recessed portion 63a as abovementiontd, whereby the chain opposite to the rear portion 63c is received into the recess 63a so that between the recess 63a and the chain CH is formed an interval more than a minimum value and keeping the recess 63a apart from the chain. Accordingly, it is possible that the chain guided to the first rear sprocket $S_1$ by the guide pulley 61 is prevented from contacting with the urging surfac 63.

Alternatively, the holding means may be constructed in such a manner that a first cam may be provided at one of the fixing member 1 and base member 2, a second cam to engage with the first cam is provided at the other, and a spring for urging the first cam toward the second cam is provided, so that the linkage mechanism may swing in the same direction as in the first emodiment. In this case, the first and second cams are provided between the movable member 5 and the chain guide 6, so that the latter may swing in the same direction as in the second embodiment.

Alternatively, a tubular shaft 71, as shown in FIGS. 10 through 14, may be slanted at the axis of the outer periphery thereof with respect to the axis of a first horizontal shaft 70.

Figure 10:
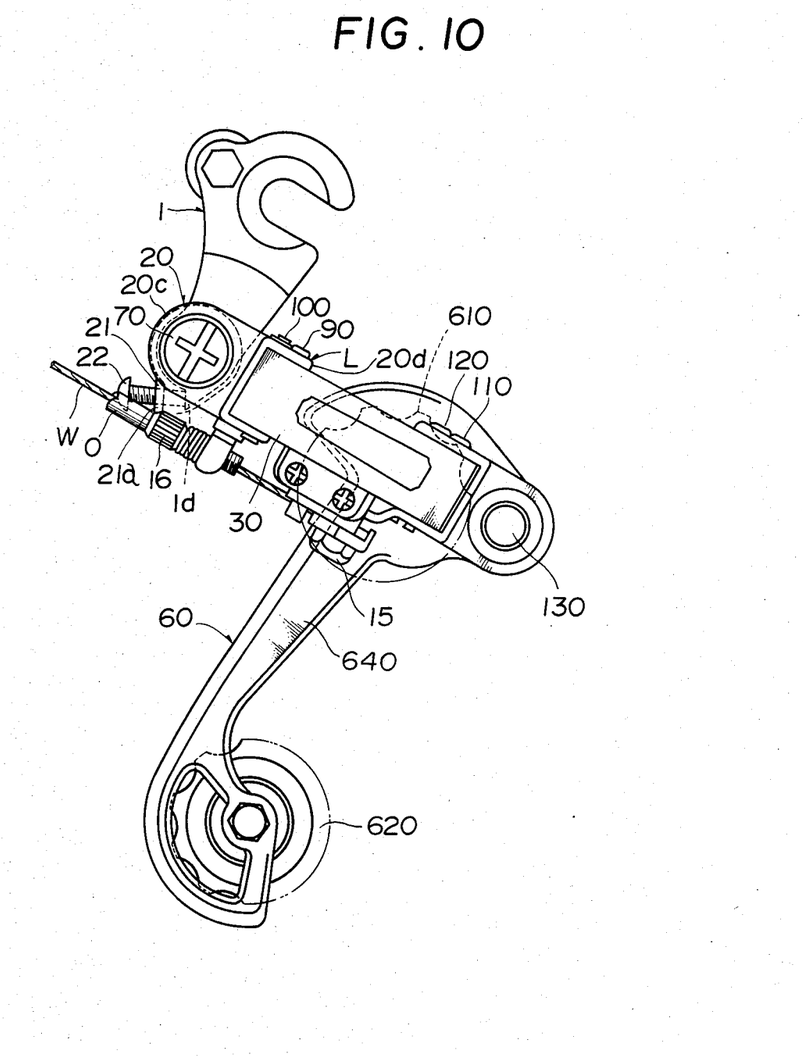
FIG. 10 is a front view of a fourth embodiment of a rear derailleur of the invention.
Figure 11:
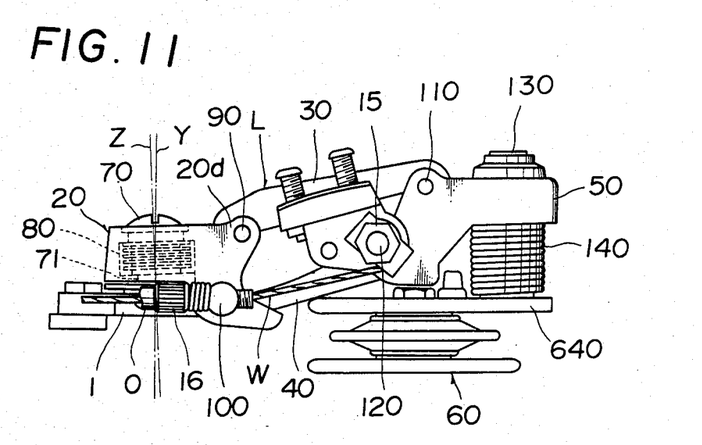
FIG. 11 is a bottom view of the FIG. 10 embodiment, corresponding to FIG. 2.
Figure 12:
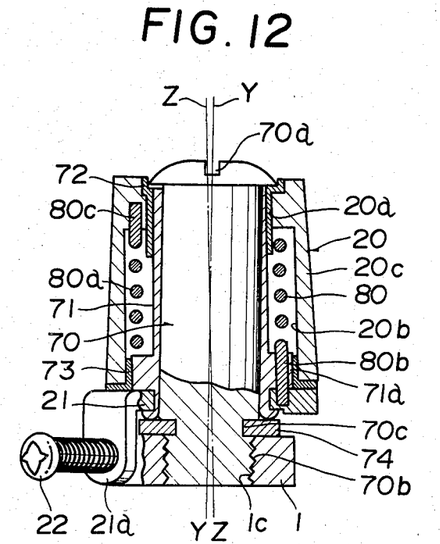
FIG. 12 is an enlarged sectional view of the principal portion of the same.
Figure 13:
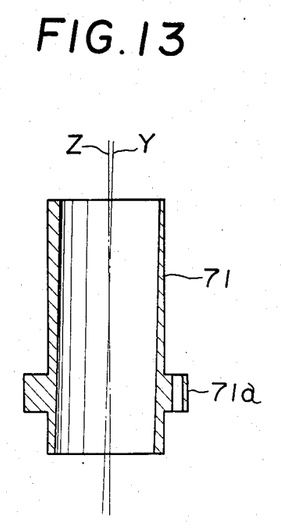
FIG. 13 is an enlarged sectional view of a tubular shaft only.
Figure 14:
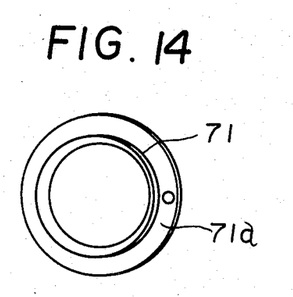
FIG. 14 is a plan view thereof.

A fixing member 1 shown in FIGS. 10 and 11 is the same as that in the first embodiment. A base member 20 supported to the fixing member 1 by the first horizontal shaft 70, as shown in FIG. 12, is provided with; a boss 20c having a through bore 20a through which the first horizontal shaft 70 perforates; and a cavity 20b for housing therein a first spring 80 constituting a first biasing means. A pair of mounting noses 20d project outwardly from the boss 20c, so that linkage members 30 and 40 are pivoted at one ends to the mounting noses 20d through a pair of pins 90 and 100 as the same as the first embodiment.

A movable member 50, as the same as that in the first embodiment, is pivoted to the free ends of the linkage members 30 and 40 through a pair of pins 110 and 120, and a chain guide 60 is provided with a guide pulley 610, a tension pulley 620 and a pulley plate 640, the pulley plate 640 being fixed to the tip of the second horizontal shaft 130 supported rotatably to the movable member 50, and a second biasing means 140 is provided, similarly to the first embodiment, between the movale member 50 and the pulley plate 640.

The first horizontal shaft 70, as shown in FIG. 12, is provided at a head having an outer flange with a rotary control 70a and at the end outer periphery with a screw thread 70b and an annular groove 70c, the screw thread 70b screwing with a threaded bore 1c at the fixing member 1.

The first biasing means 80 comprises a coiled portion 80a and first and second retaining portions 80b and 80c extending axially outwardly from both ends of the coiled portion 80a.

The tubular shaft 71 is fitted rotatably onto the first horizontal shaft 70, a boss 20c of the base member 20 is supported rotatably onto the outer periphery at both axial ends of tubular shaft 71, the axis Z-z of the tubular shaft 71 with respect to the outer periphery thereof is slanted to the axis Y-y of the first horizontal shaft 70 in the direction of displacing the movable member 50, in turn the guide pulley 610, axially outwardly of the first horizontal shaft 70, in other words, of the multistage rear sprocket assembly S.

The tubular shaft 71 has a slightly larger inner diameter than an outer diameter of the first horizontal shaft 70, the head of the first horizontal shaft 70 and a snap ring 74 retained into the annular groove 70c retain therebetween axial movement of the tubular shaft 71 so that the thrust generated when the first horizontal shaft 70 screws with the threaded bore 1c, is applied on the snap ring 74, thereby allowing the tubular shaft 71 to be rotatable with respect to the first horizontal shaft 70.

Also, the tubular shaft 71 is provided at the outer periphery at one end portion with a larger diameter portion 71a, to the end portion beyond the larger diameter portion 71a at the tubular shaft 71 is supported a stopper plate 21 having a mounting nose 21a opposite to the base member 20 in the swinging direction thereof with respect to a stopper 1d formed on the fixing member 1, the tubular shaft 71 is calked at one end edge to fix the stopper plate 21 to the tubular shaft 71, the first retaining portion 80b at the first biasing means 80 is retained to the stopper plate 21, the second retaining portion 80c is retained to a retaining bore provided in the cavity 20b at the base member 20, the mounting nose 21a screws with an adjusting screw 22 abutting against the stopper 1d, and the thrust of the first biasing means 80 allows the adjusting screw 22 to abut against the stopper 1d, thereby preventing the tubular shaft 71 from rotating together with the base member 20.

Thus, the tubular shaft 71 is slanted at the axis Z-z as to its outer periphery with respect to the axis Y-y of the first horizontal shaft 70 in the direction of displacing the movable member 50 axially outwardly of the first horizontal shaft 70 when the linkage mechanism L swings around the first horizontal shaft 70 against the first biasing means 80. Hence, the chain guided to the first rear sprocket $S_1$ by the guide pulley 610, even when shifted from the smaller diameter front sprocket to the larger diameter front sprocket, is prevented from contacting with the urging surface at the pulley plate 640, the first rear sprocket $S_1$, or the crest of the tooth at the second rear sprocket $S_2$.

Also, the tubular shaft 71 is formed into various kinds of different angles of inclination of the axis Z-z corresponding to construction of each sprocket and a tubular shaft corresponding to the sprocket construction is selected for use. Hence, the angle of inclination of the axis Z-z at the tubular shaft 71 is desirably designable. Also, since the first horizontal shaft 70 is not slanted to the axis X-x of the hub shaft, the existing fixing member is usuable.

Since the tubular shaft 71 is rotatable with respect to the fixing member 1, the adjusting screw 22 is rotationally operated to enable the tubular shaft 71 to be adjusted in position with respect to the fixing member 1. As a result, the angle of inclination of the aforesaid axis Z-z is fine-adjustable in a predetermined range.

Alternatively, the tubular shaft 71 may be fixed to the fixing member 1 in press-contact with the fixing member 1 by use of, for example, a tightening torque of the first horizontal shaft 70.

Alternatively, when the fork end is provided with a threaded bore, the fixing member 1 may be omitted so that the first horizontal shaft 70 may screw with the threaded bore. In this case, the adjusting screw 22 mounted on the stopper plate 21 abuts against a stopper at the fork end, or the stopper plate 21, without using the adjusting screw 22, is retained not-rotatably to the fork end. Incidentally, the stopper palte 21 is not indispensable, so that when it is not used, the first retaining end of the first biasing means 80 is retained to the fork end when the first horizontal shaft 70 is fixed to the fork end.

As seen from the above, the present invention is provided with the holding means for keeping more than a predetermined value the interval between the chain and the urging surface on the pulley plate at the chain guide opposite to the chain when the linkage mechanism pivoted to the fixing member through the first horizontal shaft and the chain guide pivoted to the linkage mechanism through the second horizontal shaft swing. Hence, when the chain is shifted from the smaller diameter front sprocket to the larger diameter one at the multistage front sprocket assembly and the linkage mechanism and chain guide swing, the interval between the chain and the urging surface can always be held more than the predetermined interval by the holding means, thereby ensuring the prevention of sound-making caused by contact of the chain guided by the chain guide with the urging surface at the pulley plate.

Furthermore, even without particular operation to restore the rear derailleur operating lever, the urging surface is contact-free from the chain, so that especially when the rear derailleur operating lever or the rear derailleur is provided with a positioning mechanism, the present invention is extremely effective.

Although several embodiments have been described, they are merely exemplary of the invention and not to be constructed as limiting, the invention being defined solely by the appended claims.

What is claimed is:

1. A rear derailleur for a bicycle which shifts a driving chain from one sprocket to another at a multistage sprocket assembly for the bicycle, said rear derailleur comprising,
   (a) a fixing member,
   (b) a linkage mechanism provided with a base member, two linkage members and a movable member,
   (c) a first horizontal shaft for pivoting said linkage mechanism swingably to said fixing member,
   (d) a chain guide comprising a guide pulley, a tension pulley, and a pulley plate having an urging surface which extends in the direction of the travelling path of said chain travelling to each sprocket at said multistage sprocket assembly and is opposite to said chain,
   (e) a second horizontal shaft for swingably pivoting said chain guide to said movable member,
   (f) a first biasing means which is interposed between said fixing member and said linkage mechanism and biases said linkage mechanism in the direction of moving said guide pulley away from the center of said multistage sprocket assembly,
   (g) a second biasing means which is interposed between said movable member and said chain guide and biases said chain guide in the direction of applying tension to said chain, and
   (h) a holding means which responds to swinging motion of said linkage mechanism and said chain guide when swinging, thereby holding an interval between said urging surface and said chain more than a predetermined interval.

2. A rear derailleur for a bicycle as set forth in claim 1, wherein said holding means allows said first horizontal shaft to incline with respect to the axis of said multistage sprocket assembly so that the direction of the inclination, when said linkage mechanism swings reversely to the biasing direction of said first biasing means, is the direction of displacing said guide pulley axially outwardly of said multistage sprocket assembly.

3. A rear derailleur for a bicycle as set forth in claim 1, wherein said holding means allows said second horizontal shaft to incline with respect to the axis of said multistage sprocket assembly, so that the direction of the inclination, when said linkage mechanism swings reversely to the biasing direction of said first biasing means, is the direction of displacing said guide pulley axially outwardly of said multistage sprocket assembly.

4. A rear derailleur for a bicycle as set forth in claim 1, wherein said holding means is provided on an urging surface of said pulley plate at said chain guide with a recess for receiving therein said chain passing along said urging surface when said linkage mechanism swings reversely to the biasing direction of said first biasing means and said chain guide swings reversely to the biasing direction of said second biasing means.

5. A rear derailleur for a bicycyle as set forth in claim 1, wherein said first horizontal shaft includes a tubular shaft having the outer periphery through which said base member at said linkage mechanism is rotatably supported, the axis of the outer periphery of said tubular shaft inclining with respect to the axis of said first horizontal shaft, so that the direction of the inclination, when said linkage mechanism swings reversely to the biasing direction of said first biasing means, is the direction of displacing said guide pulley axially outwardly of said multistage sprocket assembly.

6. A rear derailleur for a bicycle as set forth in claim 5, wherein said tubular shaft is rotatable with respect to said fixing member and has a stopper plate opposite to a stopper formed at said fixing member, said stopper plate having an adjusting screw abutting against said stopper.

* * * * *